(12) United States Patent
Eisen et al.

(10) Patent No.: US 11,026,807 B2
(45) Date of Patent: Jun. 8, 2021

(54) EXPANDABLE, ANGULARLY ADJUSTABLE INTERVERTEBRAL CAGES

(71) Applicant: EIT EMERGING IMPLANT TECHNOLOGIES GMBH, Wurmlingen (DE)

(72) Inventors: Guntmar Eisen, Tuttlingen (DE); Detlev Ganter, Bräunlingen (DE); Marcus Eif, Holtendorf (DE)

(73) Assignee: EIT Emerging Implant Technologies GmbH, Wurmlingen (DE)

( * ) Notice: Subject to any disclaimer, the term of this patent is extended or adjusted under 35 U.S.C. 154(b) by 15 days.

(21) Appl. No.: 15/635,480

(22) Filed: Jun. 28, 2017

(65) Prior Publication Data
US 2017/0367843 A1 Dec. 28, 2017

Related U.S. Application Data

(60) Provisional application No. 62/355,577, filed on Jun. 28, 2016.

(51) Int. Cl.
*A61F 2/44* (2006.01)
*A61F 2/30* (2006.01)

(52) U.S. Cl.
CPC .......... *A61F 2/447* (2013.01); *A61F 2/30734* (2013.01); *A61F 2/4425* (2013.01);
(Continued)

(58) Field of Classification Search
CPC ............... A61F 2/4455–447; A61F 2002/4475
See application file for complete search history.

(56) References Cited

U.S. PATENT DOCUMENTS

2002/0068976 A1* 6/2002 Jackson ............... A61F 2/4455
  623/17.15
2002/0068977 A1 6/2002 Jackson
(Continued)

FOREIGN PATENT DOCUMENTS

| CN | 204971722 U | 1/2016 |
| FR | 3026294 | 4/2016 |
| WO | 2016/118246 | 7/2016 |

OTHER PUBLICATIONS

CN Office Action dated Apr 24, 2020 for CN Application No. 201780040910.

*Primary Examiner* — Amy R Sipp
(74) *Attorney, Agent, or Firm* — BakerHostetler

(57) ABSTRACT

The embodiments provide various interbody fusion spacers, or cages, for insertion between adjacent vertebrae. These intervertebral cages can restore and maintain intervertebral height of the spinal segment to be treated, and stabilize the spine by restoring sagittal balance and alignment. The cages may have a first, insertion configuration characterized by a reduced size at each of their insertion ends to facilitate insertion through a narrow access passage and into the intervertebral space. The cages may be expanded to a second, expanded size once implanted. In their second configuration, the cages are able to maintain the proper disc height and stabilize the spine by restoring sagittal balance and alignment. The intervertebral cages are configured to be able to adjust the angle of lordosis, and can accommodate larger lodortic angles in their second, expanded configuration. Further, these cages may promote fusion to further enhance spine stability by immobilizing the adjacent vertebral bodies.

18 Claims, 19 Drawing Sheets

(52) U.S. Cl.
CPC ............... *A61F 2002/30018* (2013.01); *A61F 2002/30471* (2013.01); *A61F 2002/30482* (2013.01); *A61F 2002/30538* (2013.01); *A61F 2002/30571* (2013.01); *A61F 2002/30579* (2013.01); *A61F 2002/30733* (2013.01); *A61F 2002/30985* (2013.01); *A61F 2002/443* (2013.01)

(56) References Cited

U.S. PATENT DOCUMENTS

| | | |
|---|---|---|
| 2012/0029636 A1 | 2/2012 | Ragab et al. |
| 2012/0109319 A1* | 5/2012 | Perisic .................... A61F 2/447 623/17.16 |
| 2014/0094917 A1* | 4/2014 | Salerni .................... A61F 2/447 623/17.16 |
| 2015/0305881 A1* | 10/2015 | Bal ......................... A61F 2/447 623/17.12 |
| 2016/0022438 A1 | 1/2016 | Lamborne et al. |
| 2016/0206440 A1* | 7/2016 | DeRidder ............. A61F 2/4455 |

\* cited by examiner

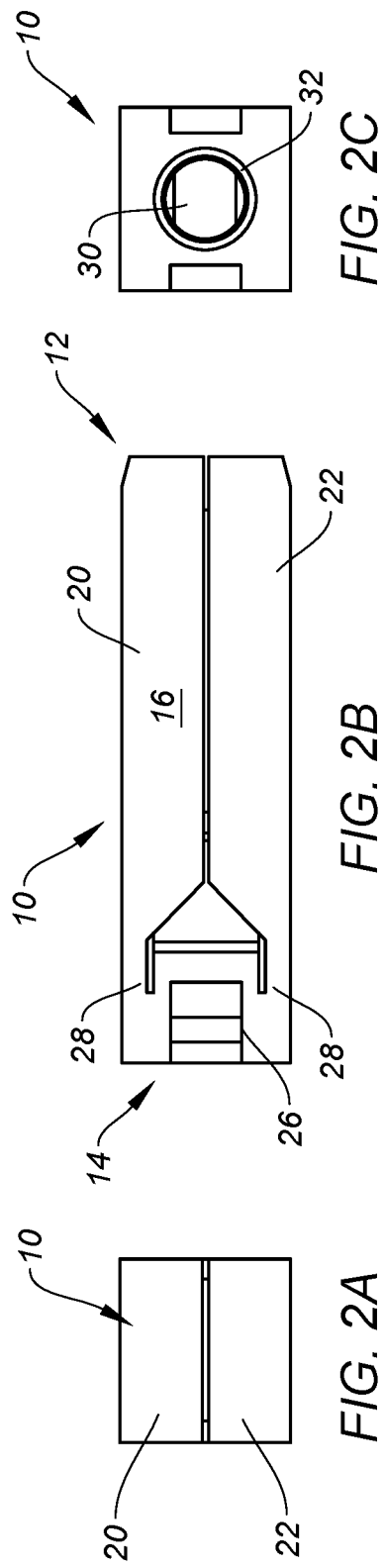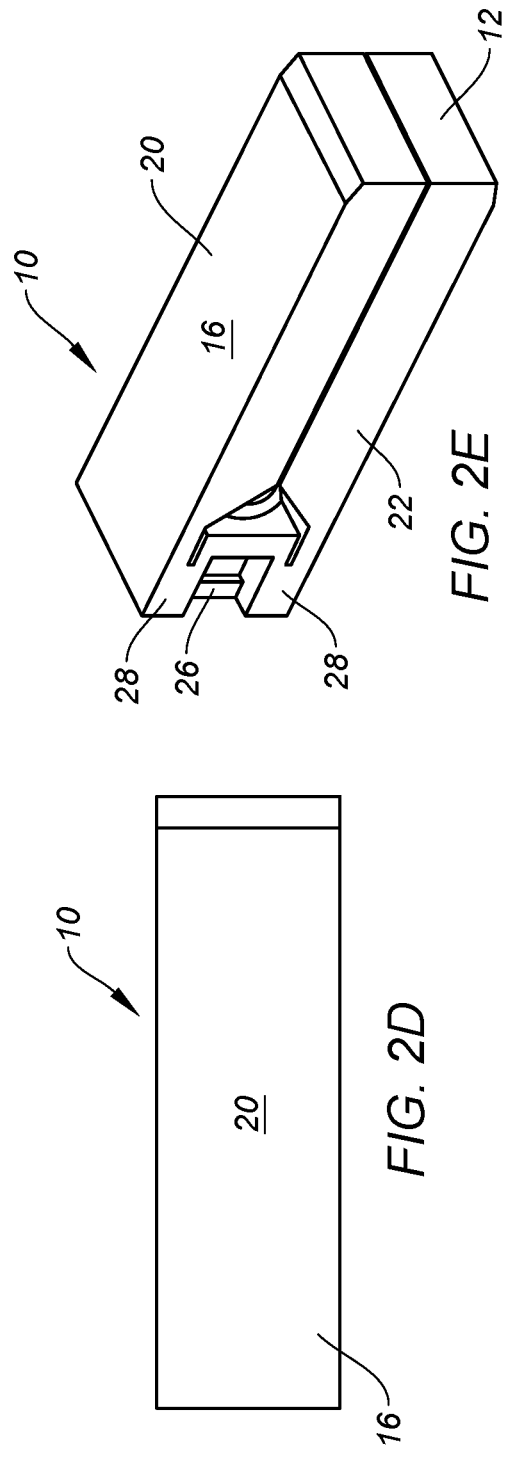

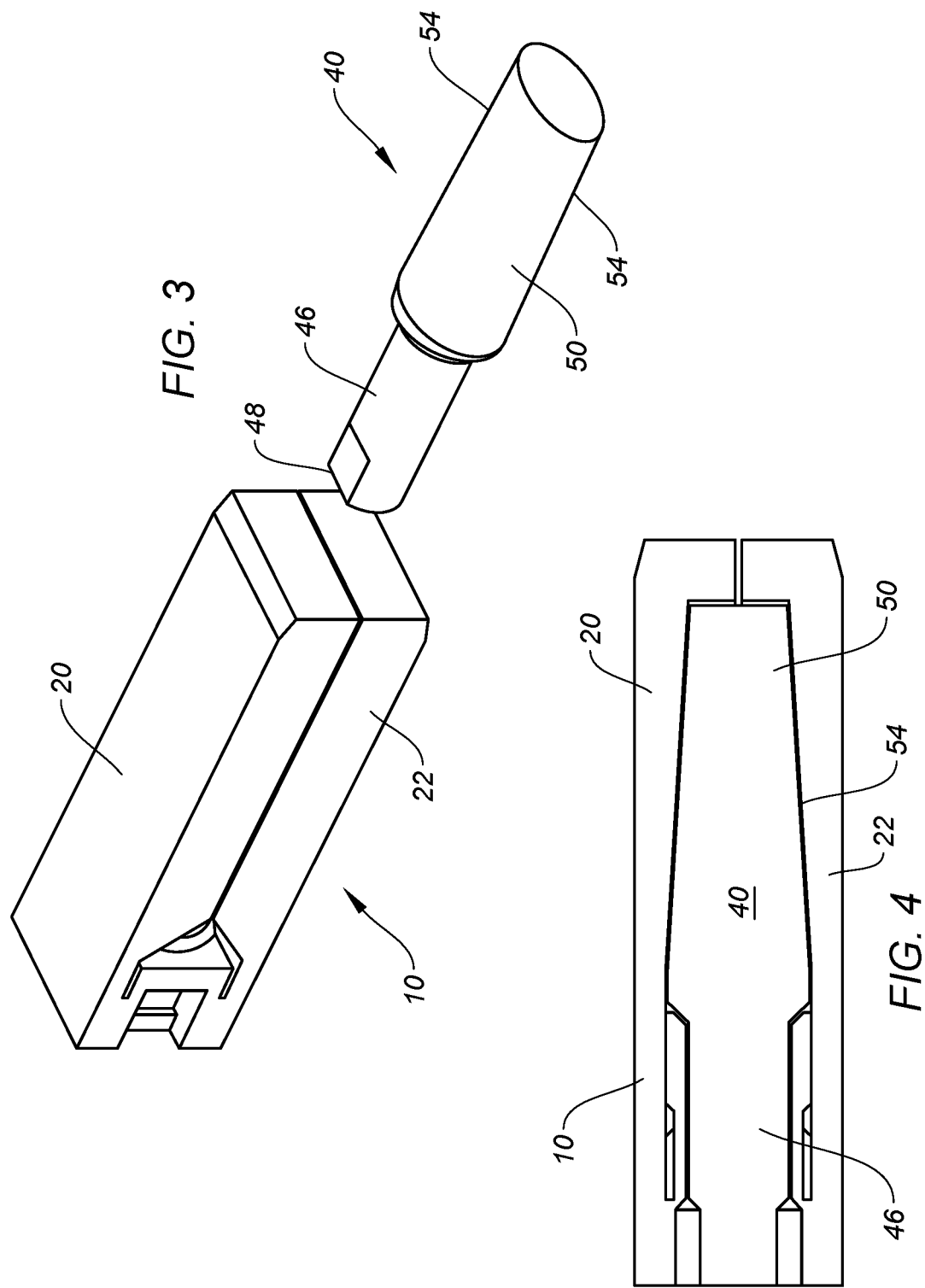

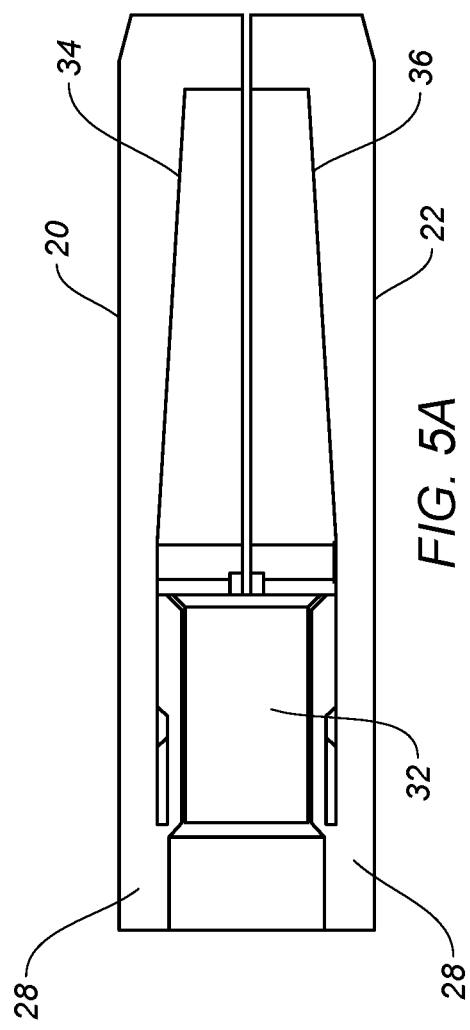
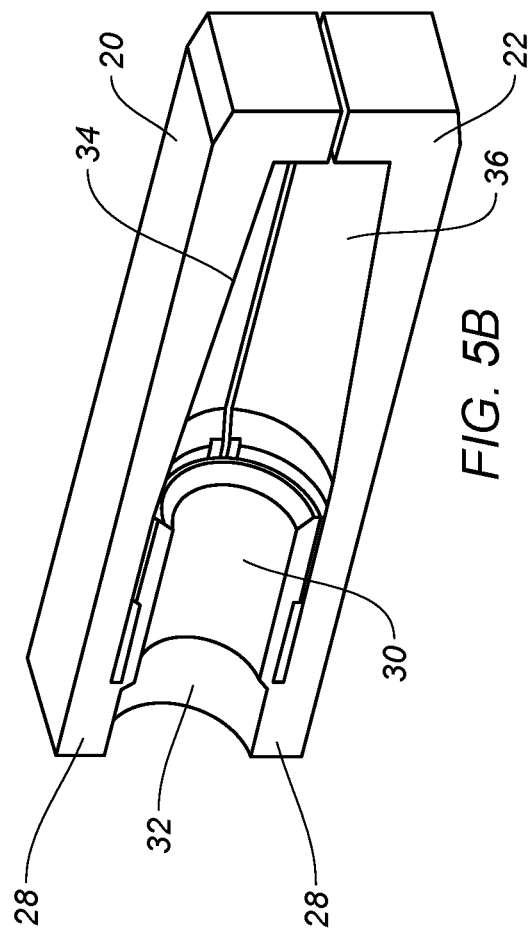
FIG. 5A
FIG. 5B

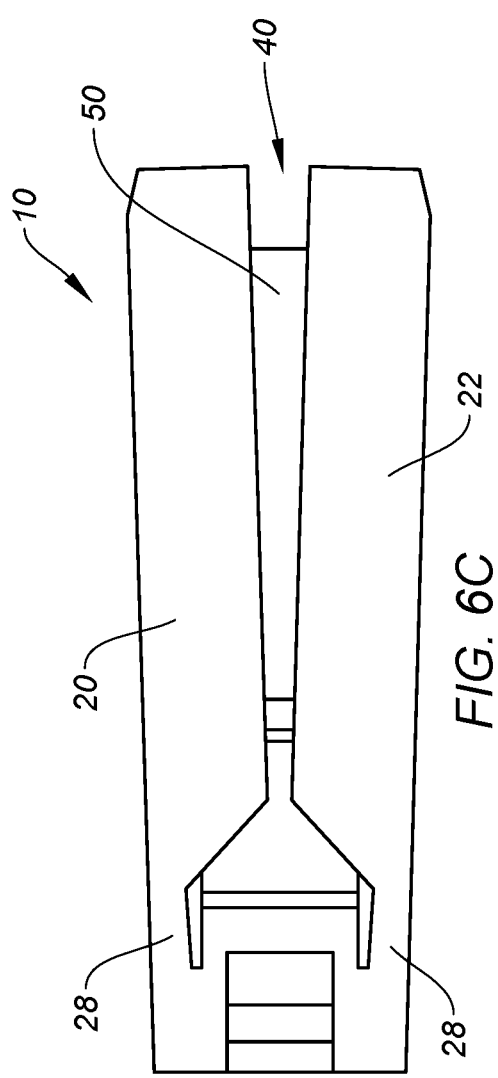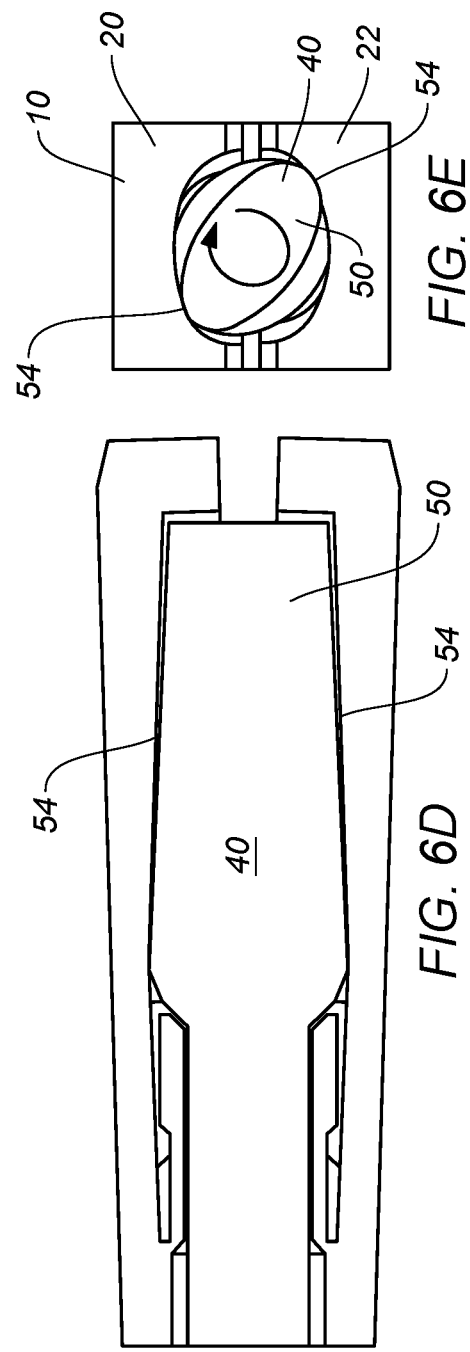
FIG. 6C
FIG. 6D
FIG. 6E

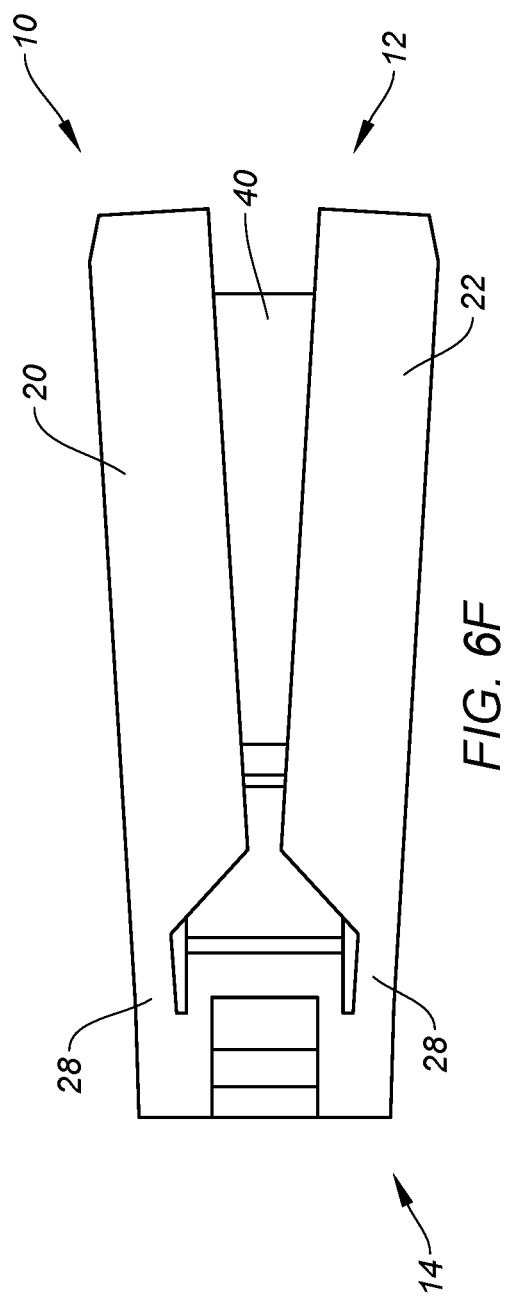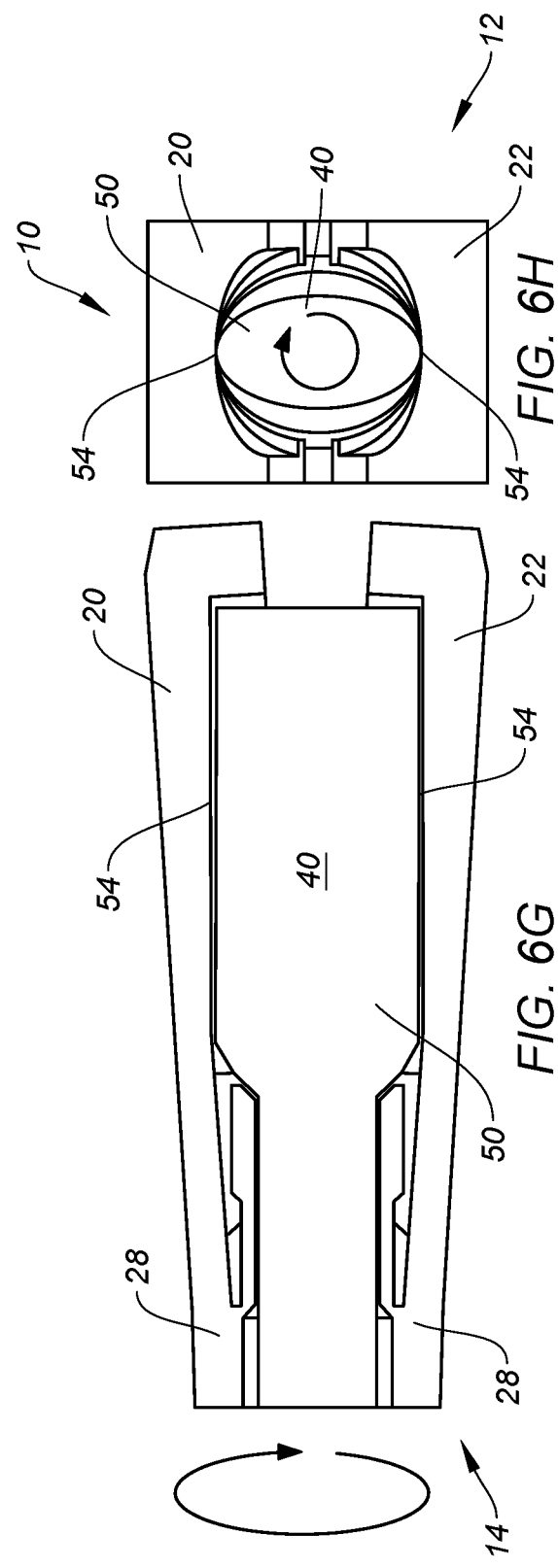

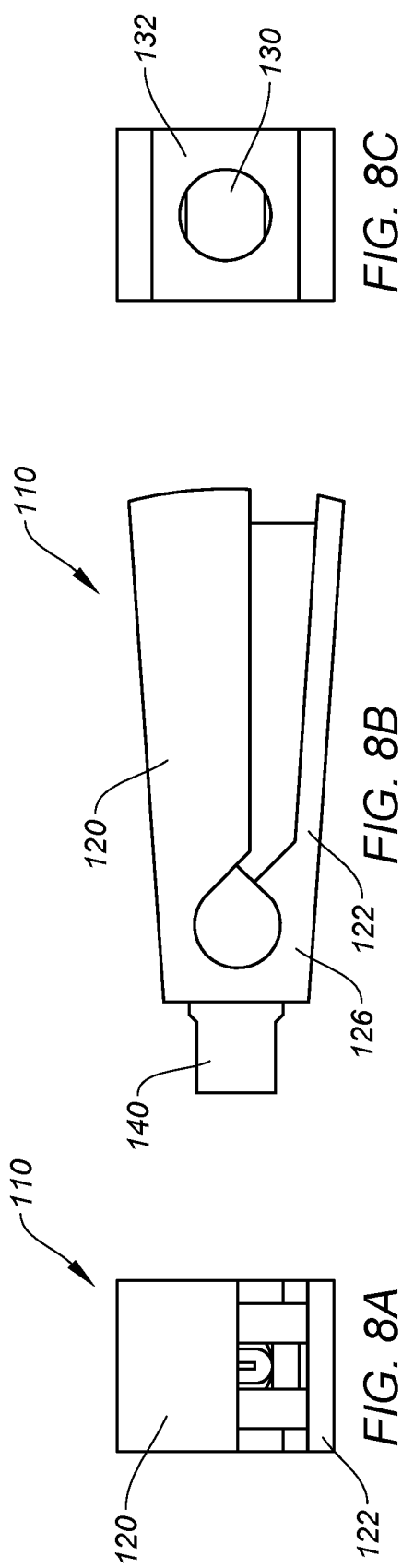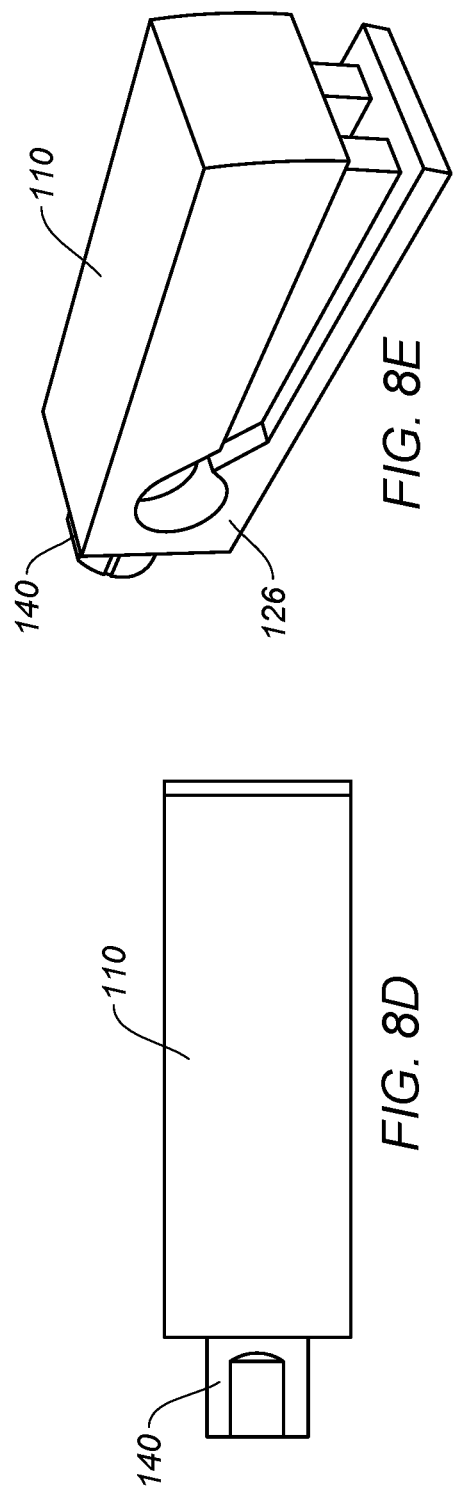

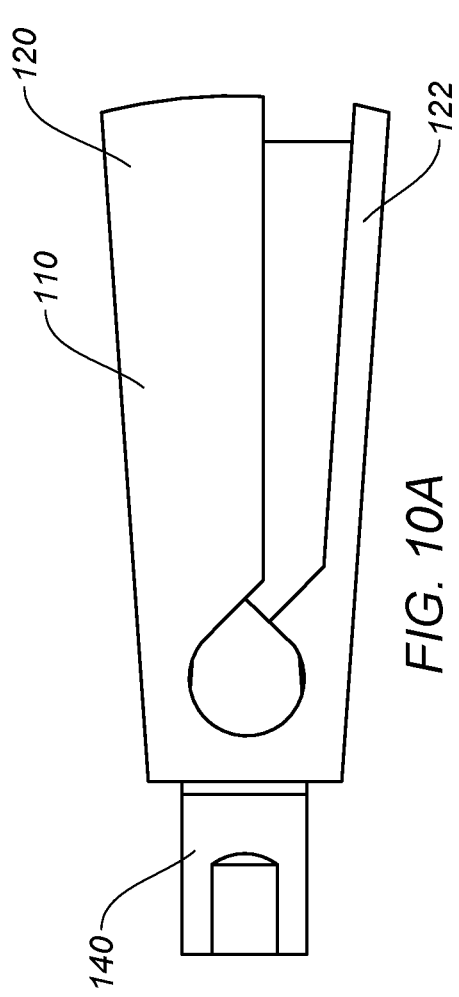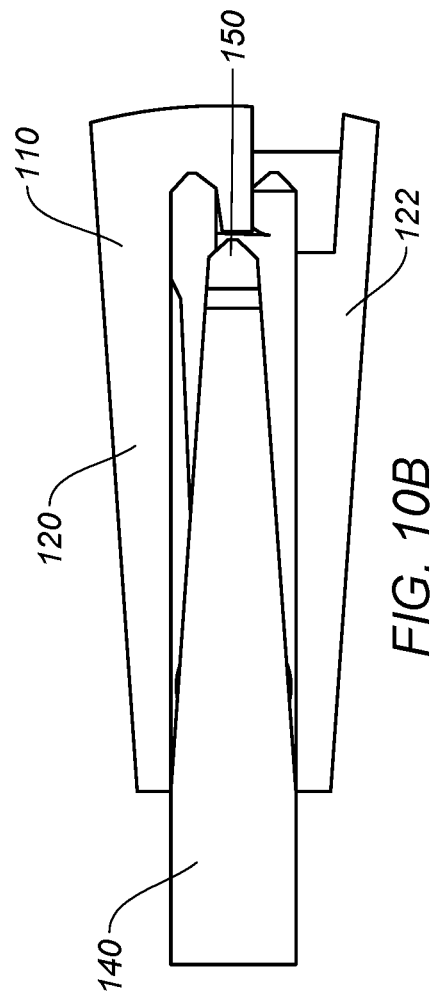
FIG. 10A
FIG. 10B

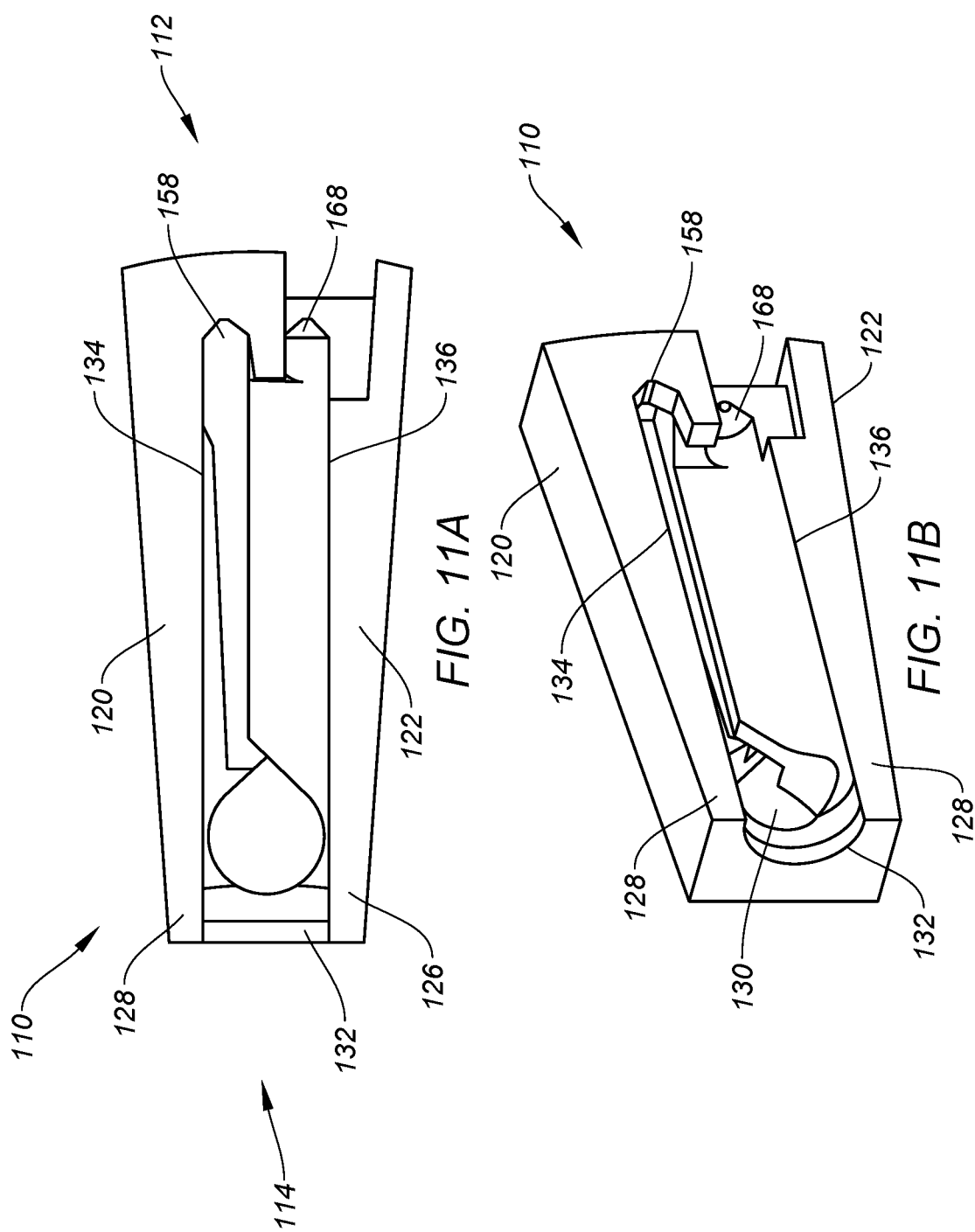

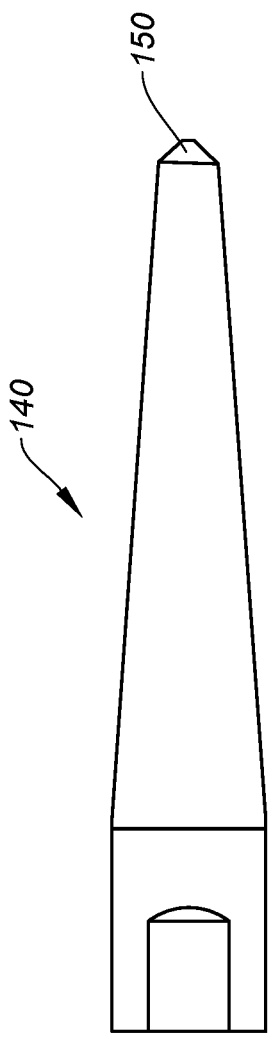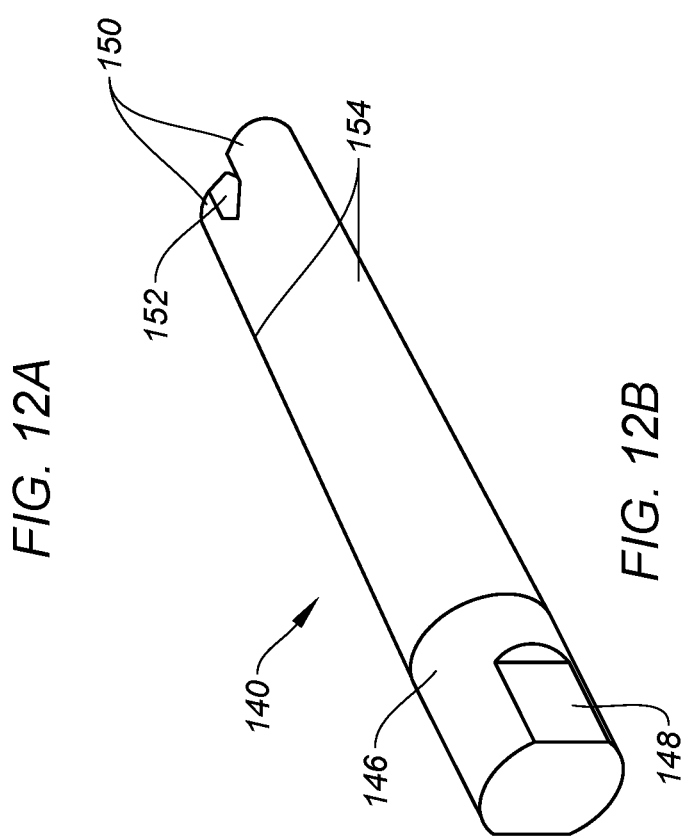
FIG. 12A
FIG. 12B

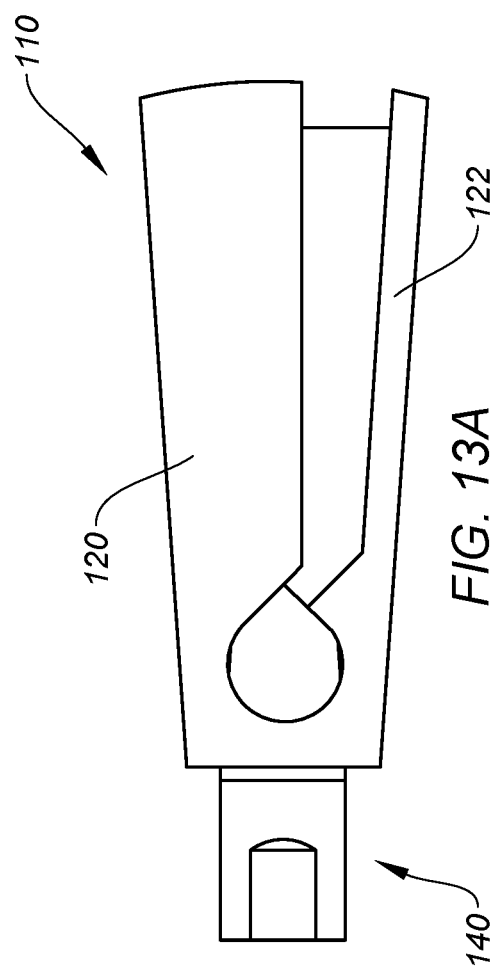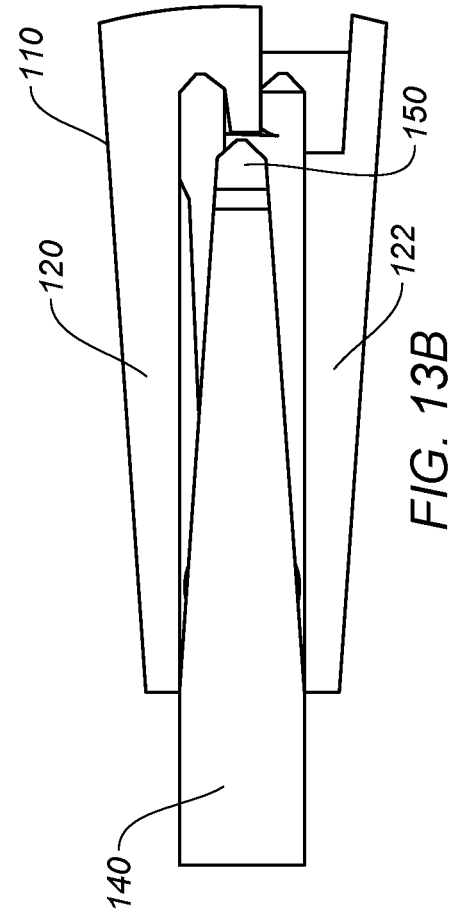
FIG. 13A
FIG. 13B

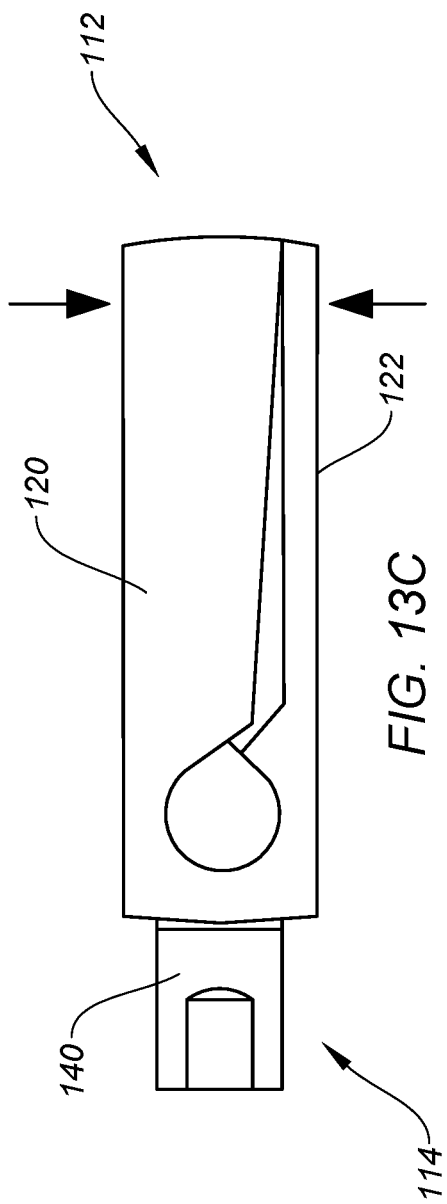
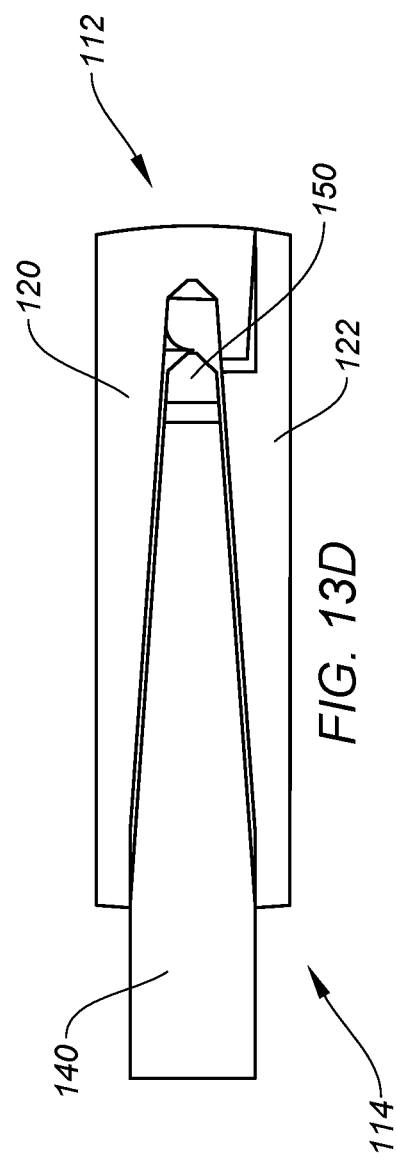

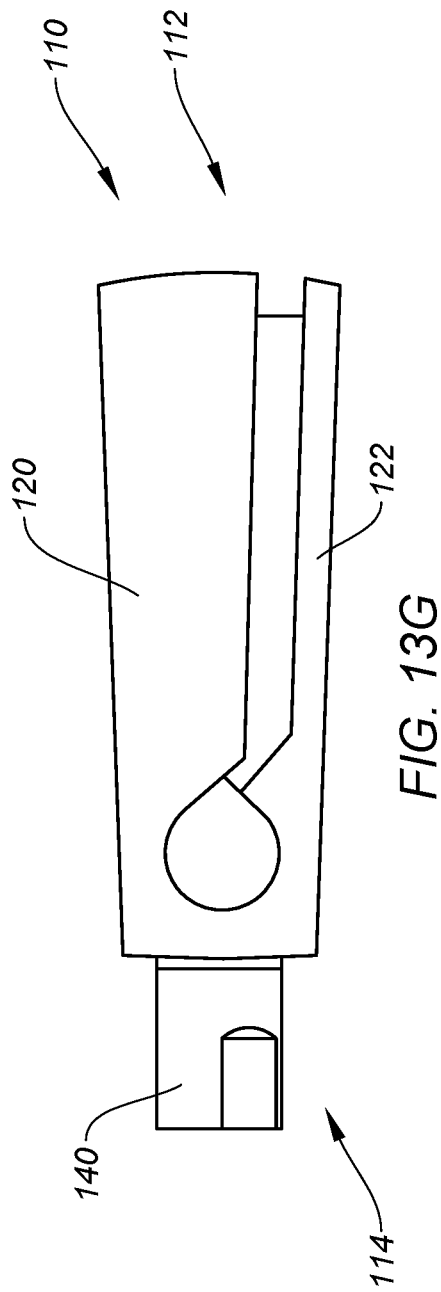
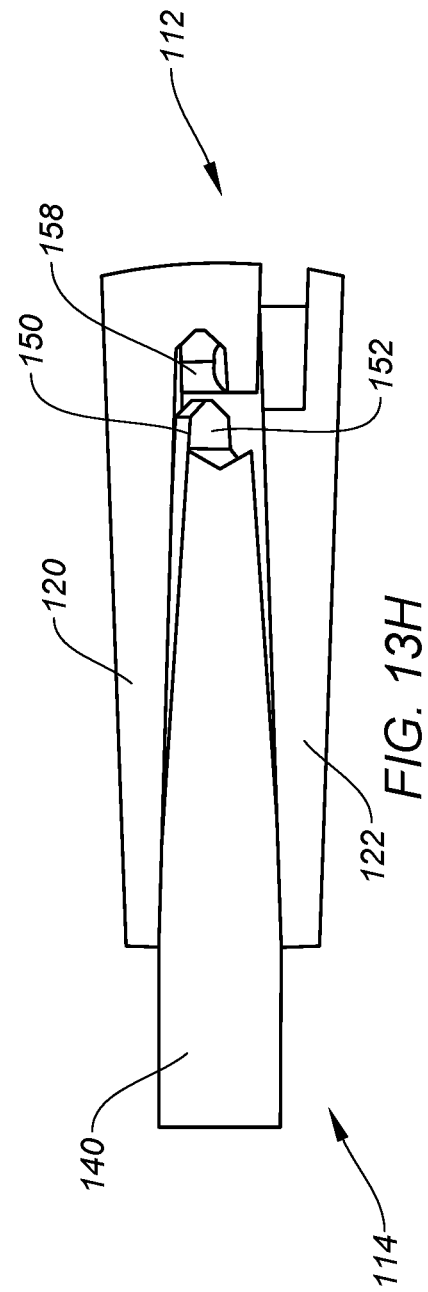
FIG. 13G
FIG. 13H

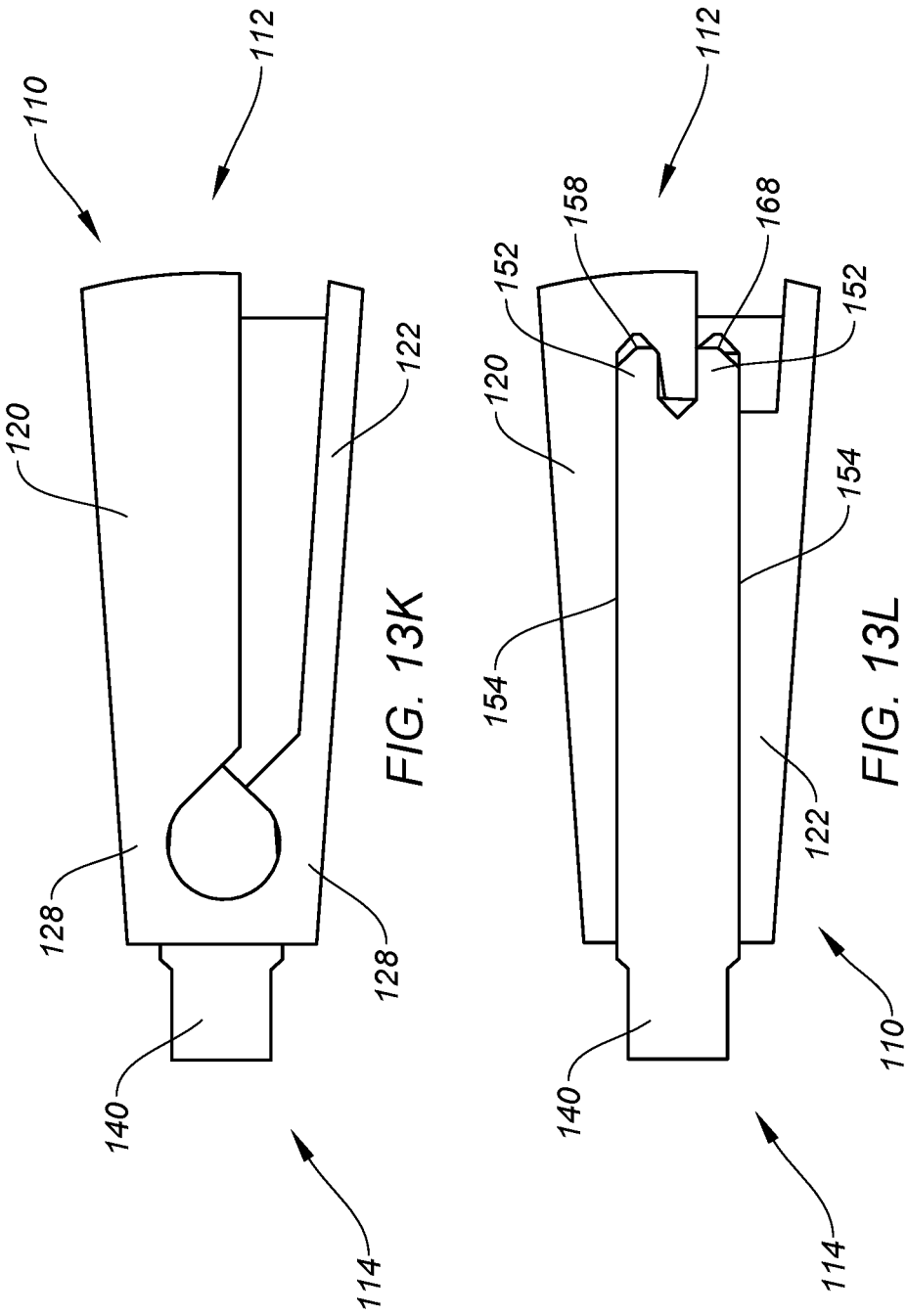

EXPANDABLE, ANGULARLY ADJUSTABLE INTERVERTEBRAL CAGES

CROSS-REFERENCE TO RELATED APPLICATIONS

This application claims benefit of U.S. Provisional Application No. 62/355,577, filed Jun. 28, 2016, the entirety of which is herein incorporated by reference.

FIELD

The present disclosure relates to orthopedic implantable devices, and more particularly implantable devices for stabilizing the spine. Even more particularly, the present disclosure is directed to expandable, angularly adjustable intervertebral cages that allow expansion from a first, insertion configuration having a reduced size to a second, implanted configuration having an expanded size. The intervertebral cages are configured to adjust and adapt to lodortic angles, particularly larger lodortic angles, while restoring sagittal balance and alignment of the spine.

BACKGROUND

The use of fusion-promoting interbody implantable devices, often referred to as cages or spacers, is well known as the standard of care for the treatment of certain spinal disorders or diseases. For example, in one type of spinal disorder, the intervertebral disc has deteriorated or become damaged due to acute injury or trauma, disc disease or simply the natural aging process. A healthy intervertebral disc serves to stabilize the spine and distribute forces between vertebrae, as well as cushion the vertebral bodies. A weakened or damaged disc therefore results in an imbalance of forces and instability of the spine, resulting in discomfort and pain. A typical treatment may involve surgical removal of a portion or all of the diseased or damaged intervertebral disc in a process known as a partial or total discectomy, respectively. The discectomy is often followed by the insertion of a cage or spacer to stabilize this weakened or damaged spinal region. This cage or spacer serves to reduce or inhibit mobility in the treated area, in order to avoid further progression of the damage and/or to reduce or alleviate pain caused by the damage or injury. Moreover, these type of cages or spacers serve as mechanical or structural scaffolds to restore and maintain normal disc height, and in some cases, can also promote bony fusion between the adjacent vertebrae.

However, one of the current challenges of these types of procedures is the very limited working space afforded the surgeon to manipulate and insert the cage into the intervertebral area to be treated. Access to the intervertebral space requires navigation around retracted adjacent vessels and tissues such as the aorta, vena cava, dura and nerve roots, leaving a very narrow pathway for access. The opening to the intradiscal space itself is also relatively small. Hence, there are physical limitations on the actual size of the cage that can be inserted without significantly disrupting the surrounding tissue or the vertebral bodies themselves.

Further complicating the issue is the fact that the vertebral bodies are not positioned parallel to one another in a normal spine. There is a natural curvature to the spine due to the angular relationship of the vertebral bodies relative to one another. The ideal cage must be able to accommodate this angular relationship of the vertebral bodies, or else the cage will not sit properly when inside the intervertebral space. An improperly fitted cage would either become dislodged or migrate out of position, and lose effectiveness over time, or worse, further damage the already weakened area.

Thus, it is desirable to provide intervertebral cages or spacers that not only have the mechanical strength or structural integrity to restore disc height or vertebral alignment to the spinal segment to be treated, but also be configured to easily pass through the narrow access pathway into the intervertebral space, and then accommodate the angular constraints of this space, particularly for larger lodortic angles.

BRIEF SUMMARY

The present disclosure describes spinal implantable devices that address the aforementioned challenges and meet the desired objectives. These spinal implantable devices, or more specifically intervertebral cages or spacers, are configured to be expandable as well as angularly adjustable. The cages may have expansion or adjustment mechanisms that allow the cage to change size and angle as needed, with little effort. The cages may have a first, insertion configuration characterized by a reduced size at each of their insertion ends to facilitate insertion through a narrow access passage and into the intervertebral space. The cages may be inserted in a first, reduced size and then expanded to a second, expanded size once implanted. In their second configuration, the cages are able to maintain the proper disc height and stabilize the spine by restoring sagittal balance and alignment. It is contemplated that, in some embodiments, the intervertebral cages may also be designed to allow the cages to expand in a freely selectable (or stepless) manner to reach its second, expanded configuration. The intervertebral cages are configured to be able to adjust the angle of lordosis, and can accommodate larger lodortic angles in their second, expanded configuration. Further, these cages may promote fusion to further enhance spine stability by immobilizing the adjacent vertebral bodies.

Additionally, the implantable devices may be manufactured using selective laser melting (SLM) techniques, a form of additive manufacturing. The devices may also be manufactured by other comparable techniques, such as for example, 3D printing, electron beam melting (EBM), layer deposition, and rapid manufacturing. With these production techniques, it is possible to create an all-in-one, multi-component device which may have interconnected and movable parts without further need for external fixation or attachment elements to keep the components together. Accordingly, the intervertebral cages of the present disclosure are formed of multiple, interconnected parts that do not require additional external fixation elements to keep together.

Even more relevant, devices manufactured in this manner would not have connection seams whereas devices traditionally manufactured would have joined seams to connect one component to another. These connection seams can often represent weakened areas of the implantable device, particularly when the bonds of these seams wear or break over time with repeated use or under stress. By manufacturing the disclosed implantable devices using additive manufacturing, one of the advantages is that connection seams are avoided entirely and therefore the problem is avoided.

Another advantage of the present devices is that, by manufacturing these devices using an additive manufacturing process, all of the components of the device (that is, both the intervertebral cage and the pins for expanding and blocking) remain a complete construct during both the insertion process as well as the expansion process. That is, multiple components are provided together as a collective single unit so that the collective single unit is inserted into the patient, actuated to allow expansion, and then allowed to remain as a collective single unit in situ. In contrast to other cages requiring external expansion screws or wedges for expansion, in the present embodiments the expansion and blocking components do not need to be inserted into the cage, nor removed from the cage, at any stage during the process. This is because these components are manufactured to be captured internal to the cages, and while freely movable within the cage, are already contained within the cage so that no additional insertion or removal is necessary.

In some embodiments, the cages can be made with an engineered cellular structure that includes a network of pores, microstructures and nanostructures to facilitate osteosynthesis. For example, the engineered cellular structure can comprise an interconnected network of pores and other micro and nano sized structures that take on a mesh-like appearance. These engineered cellular structures can be provided by etching or blasting to change the surface of the device on the nano level. One type of etching process may utilize, for example, HF acid treatment. In addition, these cages can also include internal imaging markers that allow the user to properly align the device and generally facilitate insertion through visualization during navigation. The imaging marker shows up as a solid body amongst the mesh under x-ray, fluoroscopy or CT scan, for example.

Another benefit provided by the implantable devices of the present disclosure is that they are able to be specifically customized to the patient's needs. Customization of the implantable devices is relevant to providing a preferred modulus matching between the implant device and the various qualities and types of bone being treated, such as for example, cortical versus cancellous, apophyseal versus central, and sclerotic versus osteopenic bone, each of which has its own different compression to structural failure data. Likewise, similar data can also be generated for various implant designs, such as for example, porous versus solid, trabecular versus non-trabecular, etc. Such data may be cadaveric, or computer finite element generated. Clinical correlation with, for example, DEXA data can also allow implantable devices to be designed specifically for use with sclerotic, normal, or osteopenic bone. Thus, the ability to provide customized implantable devices such as the ones provided herein allow the matching of the Elastic Modulus of Complex Structures (EMOCS), which enable implantable devices to be engineered to minimize mismatch, mitigate subsidence and optimize healing, thereby providing better clinical outcomes.

In one exemplary embodiment, an expandable spinal implant is provided. The expandable spinal implant may comprise a body having an upper plate and a lower plate connected together by an elastically deformable hinge, each of the plates including an inner ramped surface, the implant further having a channel for receiving a lever pin. The implant may further comprise a lever pin comprising a shaft having at one end a keyed surface, the lever pin further having at an opposed end an enlarged, shaped head, the shaped head further including an exterior adjustment surface that cooperates with the ramped surfaces of the plates upon rotation to urge the plates apart. The body and the pin may be manufactured by an additive production technique, with the lever pin being manufactured to reside inside but still be rotatable within the body of the cage. The enlarged, shaped head of the lever pin may have an oblong cross-section. Further, the upper and lower plates may be tapered at the first, leading end. In some embodiments, the expandable spinal implant may be a PLIF cage. The expandable spinal implant may have a first configuration wherein the plates are parallel to one another, and a second configuration wherein the plates are locked together and are angled relative to one another. In the second configuration, the implant adjusts the angle of lordosis, and restores the sagittal balance and alignment of the spine.

In another exemplary embodiment, an expandable spinal implant is provided. The spinal implant may comprise a body having an upper plate and a lower plate connected by an elastically deformable hinge, each of the plates including an inner adjustment surface and a cavity, the implant further having a channel for receiving an actuator pin. The actuator pin may comprise a shaft having at one end a keyed surface, and extending into a pin tip at an opposed end, the pin having a notch at the tip, and an exterior adjustment surface that cooperates with the inner adjustment surfaces of the plates upon rotation to urge the plates apart. The body and the actuator pin may be manufactured by an additive production technique, with the actuator pin being manufactured to reside inside but still be rotatable within the body of the cage. The pin tip may be configured to nest within the cavities of the upper and lower plates, while the notch of the pin tip may be configured to mate with the cavities of the upper and lower plates. In some embodiments, the expandable spinal implant may be a PLIF cage, and the inner adjustment surface can comprise a ramped surface. The expandable spinal implant may have a resting state configuration in which the plates are angled relative to one another, an insertion configuration wherein the plates are parallel to one another, and an expanded configuration wherein the plates are locked together and are angled relative to one another. In the second configuration, the implant adjusts the angle of lordosis, and restores the sagittal balance and alignment of the spine.

Although the following discussion focuses on spinal implants, it will be appreciated that many of the principles may equally be applied to other structural body parts requiring bone repair or bone fusion within a human or animal body, including other joints such as knee, shoulder, ankle or finger joints.

It is to be understood that both the foregoing general description and the following detailed description are exemplary and explanatory only and are not restrictive of the disclosure. Additional features of the disclosure will be set forth in part in the description which follows or may be learned by practice of the disclosure.

BRIEF DESCRIPTION OF THE DRAWINGS

The accompanying drawings, which are incorporated in and constitute a part of this specification, illustrate several embodiments of the disclosure and together with the description, serve to explain the principles of the disclosure.

FIG. 2A illustrates an anterior view of the intervertebral cage of FIG.

FIG. 2B illustrates a lateral view of the intervertebral cage of FIG. 1.

FIG. 2C illustrates a posterior view of the intervertebral cage of FIG.

FIG. 2D illustrates a cranial-caudal view of the intervertebral cage of FIG. 1.

FIG. 2E illustrates an isometric view of the intervertebral cage of FIG. 1.

FIG. 3 illustrates an exploded view of the intervertebral cage of FIG. 1 and associated lever pin.

FIG. 4 illustrates a cross-sectional view of the intervertebral cage of FIG. 1 and associated lever pin in its manufactured position.

FIGS. 5A and 5B illustrate cross-sectional views of the intervertebral cage of FIG. 1, in which FIG. 5A shows a side cross-sectional view and FIG. 5B shows a perspective cross-sectional view.

FIGS. 6A-6H illustrate a method of expanding the intervertebral cage of FIG. 1, in which FIGS. 6A, 6C, and 6F illustrate lateral views of the cage over the course of expansion, FIGS. 6B, 6D, and 6G illustrate cross-sectional views of the cage over expansion, and FIGS. 6E and 6H illustrate anterior views of the cage over the course of expansion.

FIG. 8A illustrates an anterior view of the expandable intervertebral cage and actuator pin of FIG. 7.

FIG. 8B illustrates a lateral view of the expandable intervertebral cage and actuator pin of FIG. 7.

FIG. 8C illustrates a posterior view of the expandable intervertebral cage and actuator pin of FIG. 7.

FIG. 8D illustrates a cranial-caudal view of the expandable intervertebral cage and actuator pin of FIG. 7.

FIG. 8E illustrates an isometric view of the expandable intervertebral cage and actuator pin of FIG. 7.

FIG. 10A illustrates the intervertebral cage with the actuator pin of FIG. 7 in its manufactured position.

FIG. 10B illustrates a partial cross-sectional view of the intervertebral cage and the inner actuator pin of FIG. 10A.

FIGS. 11A and 11B illustrate partial cross-sectional views of the intervertebral cage of FIG. 7, in which FIG. 11A shows a side cross-sectional view and FIG. 11B shows a perspective cross-sectional view.

FIGS. 12A and 12B illustrate a planar and perspective view, respectively, of the inner actuator pin of FIG. 9.

FIGS. 13A-13L illustrate a method of compressing and expanding the intervertebral cage of FIG. 7, in which FIGS. 13A, 13C, 13E, 13G, 13I, and 13K illustrate lateral views of the cage over the course of expansion, while FIGS. 13B, 13D, 13F, 13H, 13J, and 13L illustrate cross-sectional views of the cage over the course of expansion.

DETAILED DESCRIPTION

Figure 1:
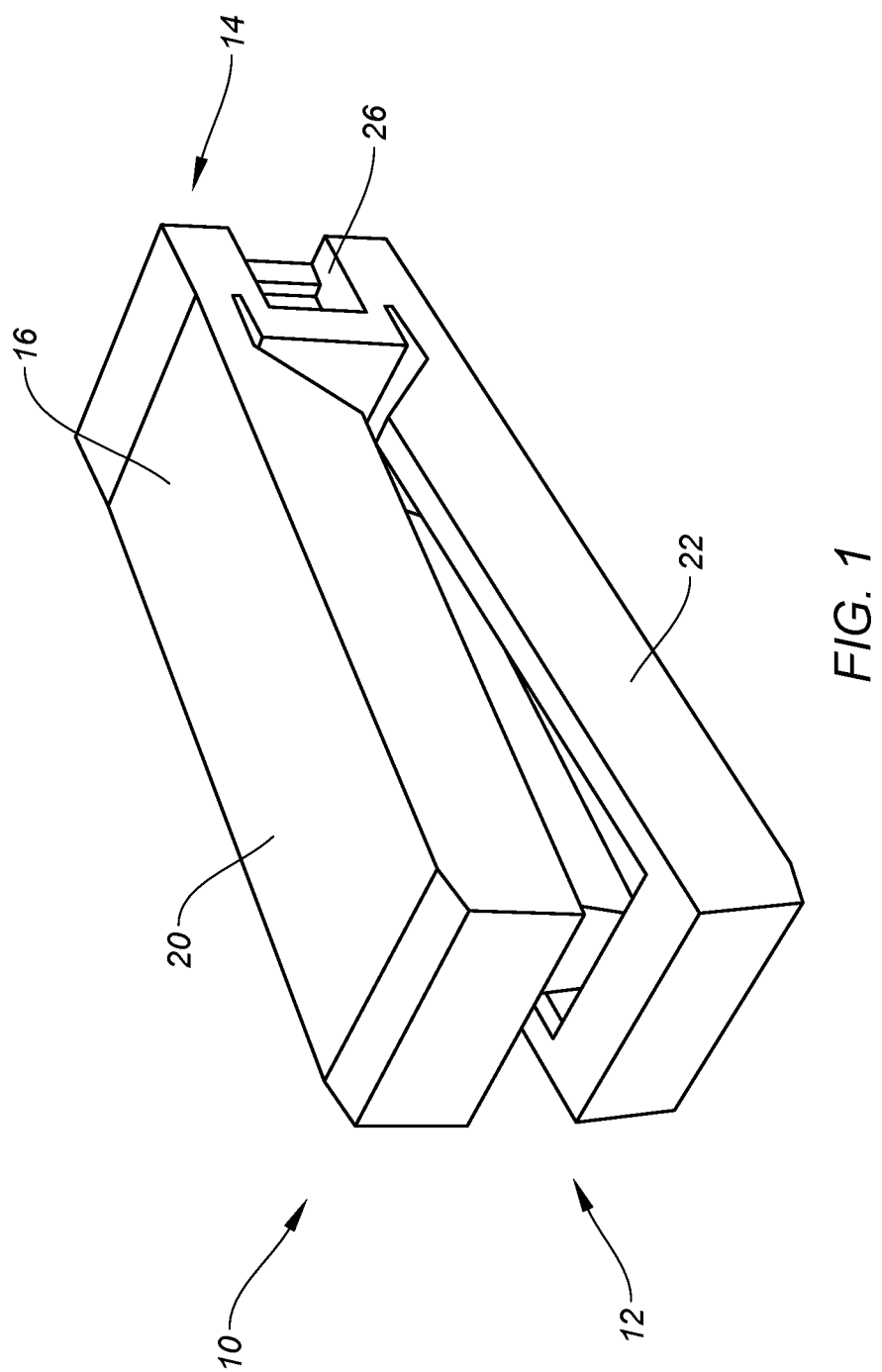
FIG. 1 illustrates a perspective view of an exemplary embodiment of an expandable intervertebral cage in accordance with the present disclosure.
Figure 6A:
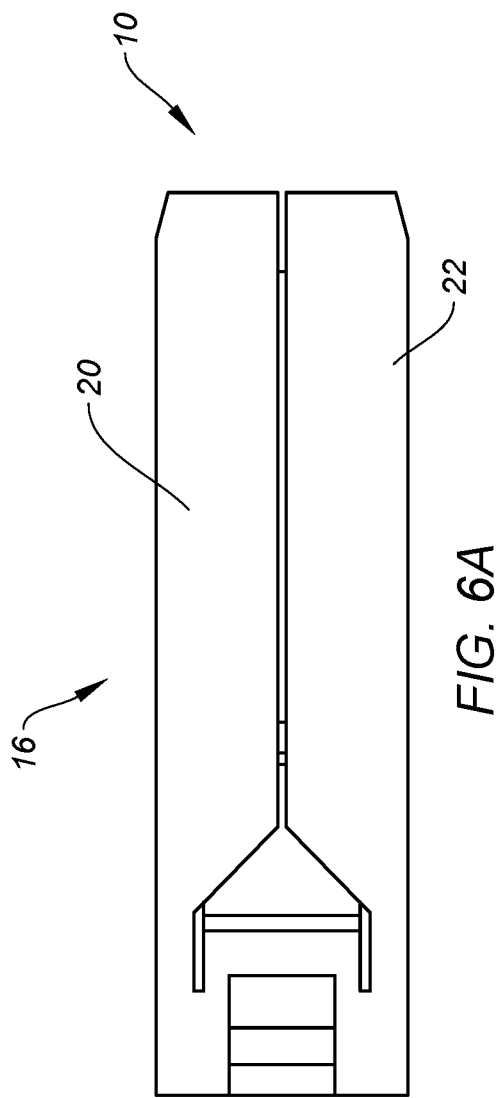
Figure 6B:
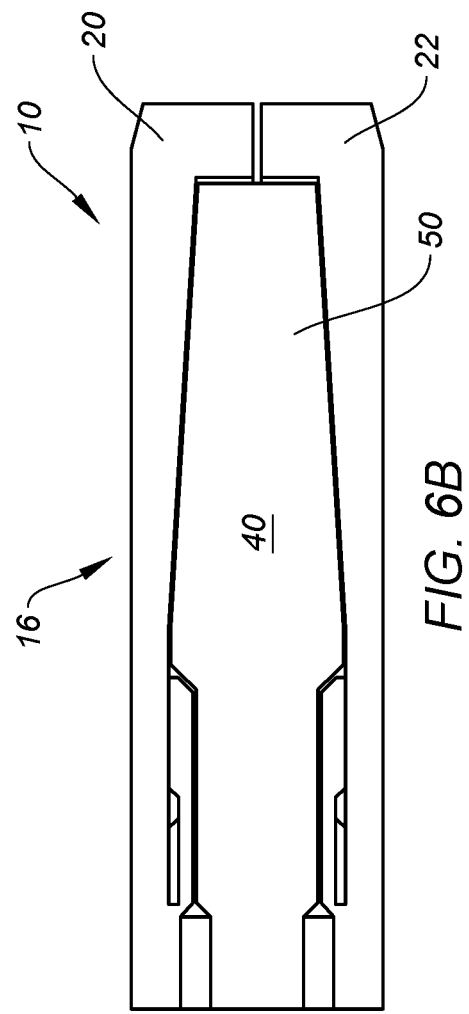

The present disclosure provides various spinal implant devices, such as interbody fusion spacers, or cages, for insertion between adjacent vertebrae. The devices can be configured for use in either the cervical or lumbar region of the spine. In some embodiments, these devices are configured as PLIF cages, or posterior lumbar interbody fusion cages. These cages can restore and maintain intervertebral height of the spinal segment to be treated, and stabilize the spine by restoring sagittal balance and alignment. The cages may have a first, insertion configuration characterized by a reduced size at each of their insertion ends to facilitate insertion through a narrow access passage and into the intervertebral space. The cages may be inserted in a first, reduced size and then expanded to a second, expanded size once implanted. In their second configuration, the cages are able to maintain the proper disc height and stabilize the spine by restoring sagittal balance and alignment. It is contemplated that, in some embodiments, the intervertebral cages may also be designed to allow the cages to expand in a freely selectable (or stepless) manner to reach its second, expanded configuration. The intervertebral cages are configured to be able to adjust the angle of lordosis, and can accommodate larger lodortic angles in their second, expanded configuration. Further, these cages may promote fusion to further enhance spine stability by immobilizing the adjacent vertebral bodies.

Additionally, the implantable devices may be manufactured using selective laser melting (SLM) techniques, a form of additive manufacturing. The devices may also be manufactured by other comparable techniques, such as for example, 3D printing, electron beam melting (EBM), layer deposition, and rapid manufacturing. With these production techniques, it is possible to create an all-in-one, multi-component device which may have interconnected and movable parts without further need for external fixation or attachment elements to keep the components together. Accordingly, the intervertebral cages of the present disclosure are formed of multiple, interconnected parts that do not require additional external fixation elements to keep together.

Even more relevant, devices manufactured in this manner would not have connection seams whereas devices traditionally manufactured would have joined seams to connect one component to another. These connection seams can often represent weakened areas of the implantable device, particularly when the bonds of these seams wear or break over time with repeated use or under stress. By manufacturing the disclosed implantable devices using additive manufacturing, connection seams are avoided entirely and therefore the problem is avoided.

Another advantage of the present devices is that, by manufacturing these devices using an additive manufacturing process, all of the components of the device (that is, both the intervertebral cage and the pins for expanding and blocking) remain a complete construct during both the insertion process as well as the expansion process. That is, multiple components are provided together as a collective single unit so that the collective single unit is inserted into the patient, actuated to allow expansion, and then allowed to remain as a collective single unit in situ. In contrast to other cages requiring external expansion screws or wedges for expansion, in the present embodiments the expansion and blocking components do not need to be inserted into the cage, nor removed from the cage, at any stage during the process. This is because these components are manufactured to be captured internal to the cages, and while freely movable within the cage, are already contained within the cage so that no additional insertion or removal is necessary.

In some embodiments, the cages can be made with a portion, or made entirely, having an engineered cellular structure that includes a network of pores, microstructures and nanostructures to facilitate osteosynthesis. For example, the engineered cellular structure can comprise an interconnected network of pores and other micro and nano sized structures that take on a mesh-like appearance. These engineered cellular structures can be provided by etching or blasting to change the surface of the device on the nano level. One type of etching process may utilize, for example, HF acid treatment. In addition, these cages can also include internal imaging markers that allow the user to properly align the cage and generally facilitate insertion through visualization during navigation. The imaging marker shows up as a solid body amongst the mesh under x-ray, fluoroscopy or CT scan, for example.

Another benefit provided by the implantable devices of the present disclosure is that they are able to be specifically customized to the patient's needs. Customization of the implantable devices is relevant to providing a preferred modulus matching between the implant device and the various qualities and types of bone being treated, such as for example, cortical versus cancellous, apophyseal versus central, and sclerotic versus osteopenic bone, each of which has its own different compression to structural failure data. Likewise, similar data can also be generated for various implant designs, such as for example, porous versus solid, trabecular versus non-trabecular, etc. Such data may be cadaveric, or computer finite element generated. Clinical correlation with, for example, DEXA data can also allow implantable devices to be designed specifically for use with sclerotic, normal, or osteopenic bone. Thus, the ability to provide customized implantable devices such as the ones provided herein allow the matching of the Elastic Modulus of Complex Structures (EMOCS), which enable implantable devices to be engineered to minimize mismatch, mitigate subsidence and optimize healing, thereby providing better clinical outcomes.

Turning now to the drawings, FIG. 1 shows an exemplary embodiment of an expandable, adjustable intervertebral cage 10 of the present disclosure. The cage 10 may comprise a unitary body or housing 16 having a pair of plates, one upper 20 and one lower 22, which may be tapered at their free ends at the first, leading end 12 of the cage 10. These plates 20, 22 are connected by an elastically deformable hinge 26 at the terminal ends of the plates near the cage's second, trailing end 14, and can be expanded as shown in FIG. 1. The hinge 26 is defined by elastic-plastic joint areas 28 that may be formed using selective cutouts at the second, trailing end 14.

As FIGS. 2A-2E show, in the first, reduced size configuration the plates 20, 22 lie parallel to one another. As FIG. 3 shows, the body 16 of the intervertebral cage 10 cooperates with a lever pin 40 to spread and block the expansion of the upper and lower plates 20, 22. As mentioned above, the devices of the present disclosure may be manufactured in such a way that the processing of all components into the final assembled device is achieved in one step by generative/additive production techniques (e.g., selective laser melting (SLM) or other similar techniques as mentioned above). FIG. 4 illustrates an exemplary manufacturing configuration showing how the cage 10 and the lever pin 40 can be manufactured nested together under such a technique. The pin 40 may comprise a shaft 46 on which there is a keyed feature 48 that functions to rotate and lock the lever pin 40. The pin 40 extends into an enlarged, shaped tip 50 that also includes an external adjustment surface 54. This tip 50 may be configured with an oval or oblong cross-sectional shape.

FIGS. 5A and 5B show the interior of the body 16 of the intervertebral cage 10. An opening 32 to a channel 30 is provided at the second, trailing end 14 for receiving the lever pin 40. Further, the plates 20, 22 have upper and lower adjustment surfaces 34, 36 that interact with the adjustment surface 54 of the lever pin 40, as will be described in more detail below.

FIGS. 6A-6F illustrate the process of adjusting the expandable intervertebral cage 10 during implantation. In its initial insertion stage, the expandable cage 10 may have a compressed, reduced size whereby the upper plate 20 and lower plate 22 are parallel to one another. This creates the most tapered and slim profile to facilitate insertion, which is particularly beneficial to traverse the narrow access path to the implant site. In some embodiments, the terminal ends of the plates 20, 22 near the first, leading end 12 can also include a bevel or taper, if desired. The plates 20, 22 may each include flat external surfaces to contact and press against the endplates of the vertebral bodies.

The lever pin 40, which may be manufactured to reside within the body 16 of cage 10 in a first insertion configuration, does not interfere with the plates 20, 22, and can be considered in a non-active state at this point. After the cage 10 has been properly inserted into the intervertebral or intradiscal space, the cage 10 may be adjusted/expanded by activating the lever pin 40. In use, movement of the plates 20, 22 is realized by levering the intervertebral cage 10 open, thereby causing the body 16 to be elastically and partially plastically deformed.

As shown in FIGS. 6C-6E, partial rotation of the lever pin 40 in the direction of the arrows causes the adjustment surface 54 of the shaped portion of the lever pin 40 to press against the adjustment surfaces 34, 36 of the upper and lower plates 20, 22. This spreads the plates 20, 22 and expands the first, leading end 12 of the cage 10 into an intermediate position. When the lever pin 40 is rotated a full 90 degrees, as shown in FIGS. 6F-6H, then the plates 20, 22 may be fully expanded and the cage 10 may be in its second, expanded configuration. The elastic-plastic joint areas 28 of the hinge 26 have been partially plastically deformed at this stage, and the cage 10 may be considered fully adjusted and in a blocked position.

As mentioned above, the intervertebral cages of the present disclosure are configured to be able to allow insertion through a narrow access path, but are able to be expanded and angularly adjusted so that the cages are capable of adjusting the angle of lordosis of the vertebral segments. By being able to partially plastically deform at the hinge 26, the cages can accommodate and adapt to larger angles of lordosis. Additionally, the cages can restore sagittal balance and alignment of the spine, and can promote fusion to immobilize and stabilize the spinal segment.

Figure 7:
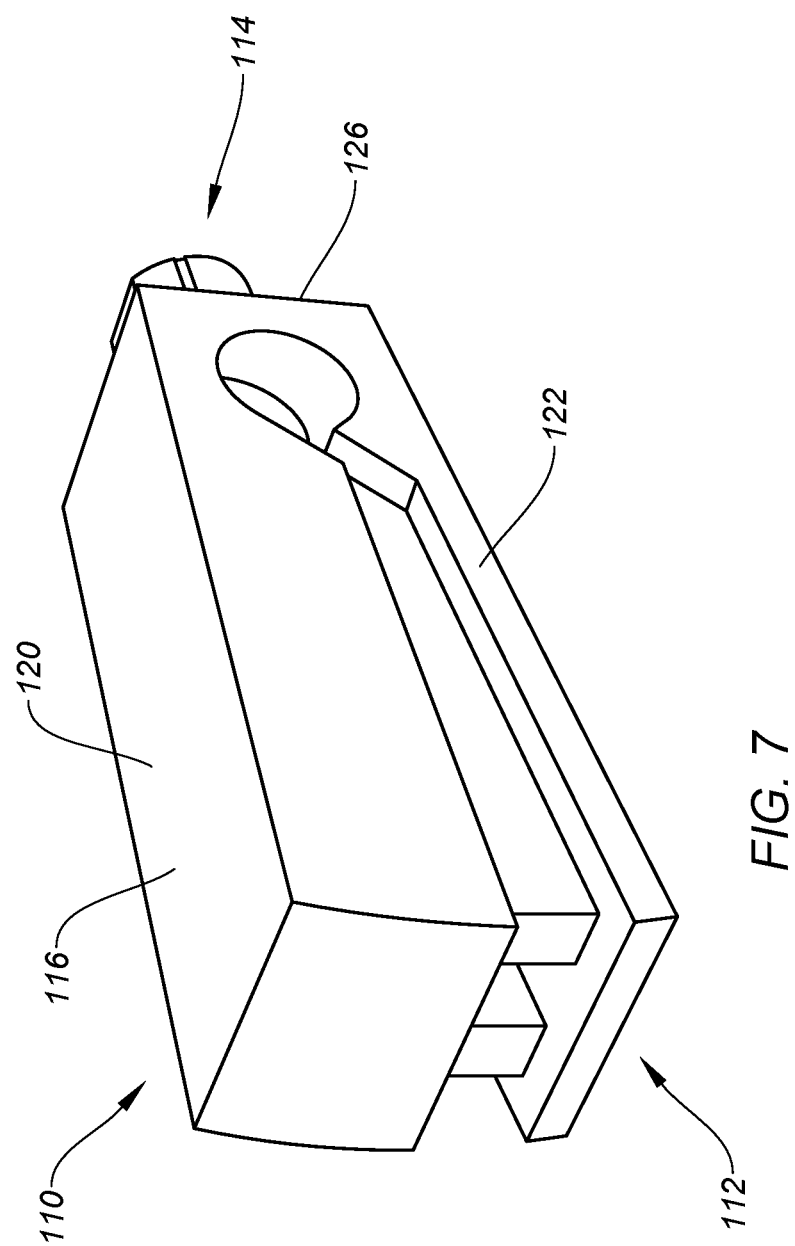
FIG. 7 illustrates a perspective view of another exemplary embodiment of an expandable intervertebral cage and associated inner actuator pin in accordance with the present disclosure.

FIG. 7 shows another exemplary embodiment of an expandable intervertebral cage and associated inner actuating pin of the present disclosure. As shown in greater detail in FIGS. 8A-8E, similar to the previous cage 10, this cage 110 may also comprise a housing or body 116 having an upper plate 120 and lower plate 122 attached at their terminal ends at an elastically deformable hinge 126. This deformable hinge 126 resides at the second, trailing end 114 of the body 116, while the free ends of the upper and lower plates 120, 122 are at the first, leading end 112 of the body 116 of the cage 110. In some embodiments, the free ends of the plates 120, 122 may be tapered or beveled to facilitate insertion. As with the previous embodiment, the intervertebral cage 110 may be formed with a cooperative inner actuator pin 140 in an additive manufacturing technique as previously described. Unlike intervertebral cage 10, however, the intervertebral cage 110 of the present embodiment is biased to be in an open or expanded configuration at rest.

As mentioned above, in the intervertebral cage 110, the resting state of the cage 110 may be an open or expanded position. In other words, the cage 110 may be manufactured so that the plates 120, 122 are biased to be in an open/lordotic position. Prior to insertion, the plates 120, 122 can be squeezed together using the actuator pin 140, which can press the plates 120, 122 together and hold them in this first, reduced size configuration so as to facilitate insertion of the cage 110. While the plates 120, 122 are held shut, the plates can be elastically and partially plastically deformed. After insertion, the plates 120, 122 can be released and automatically open to a certain amount due to the stored elastic energy at the hinge 126. Lastly, the plates 120, 122 can be actively opened to their second, final configuration and locked in place using the inner actuator pin 140.

Figure 9:
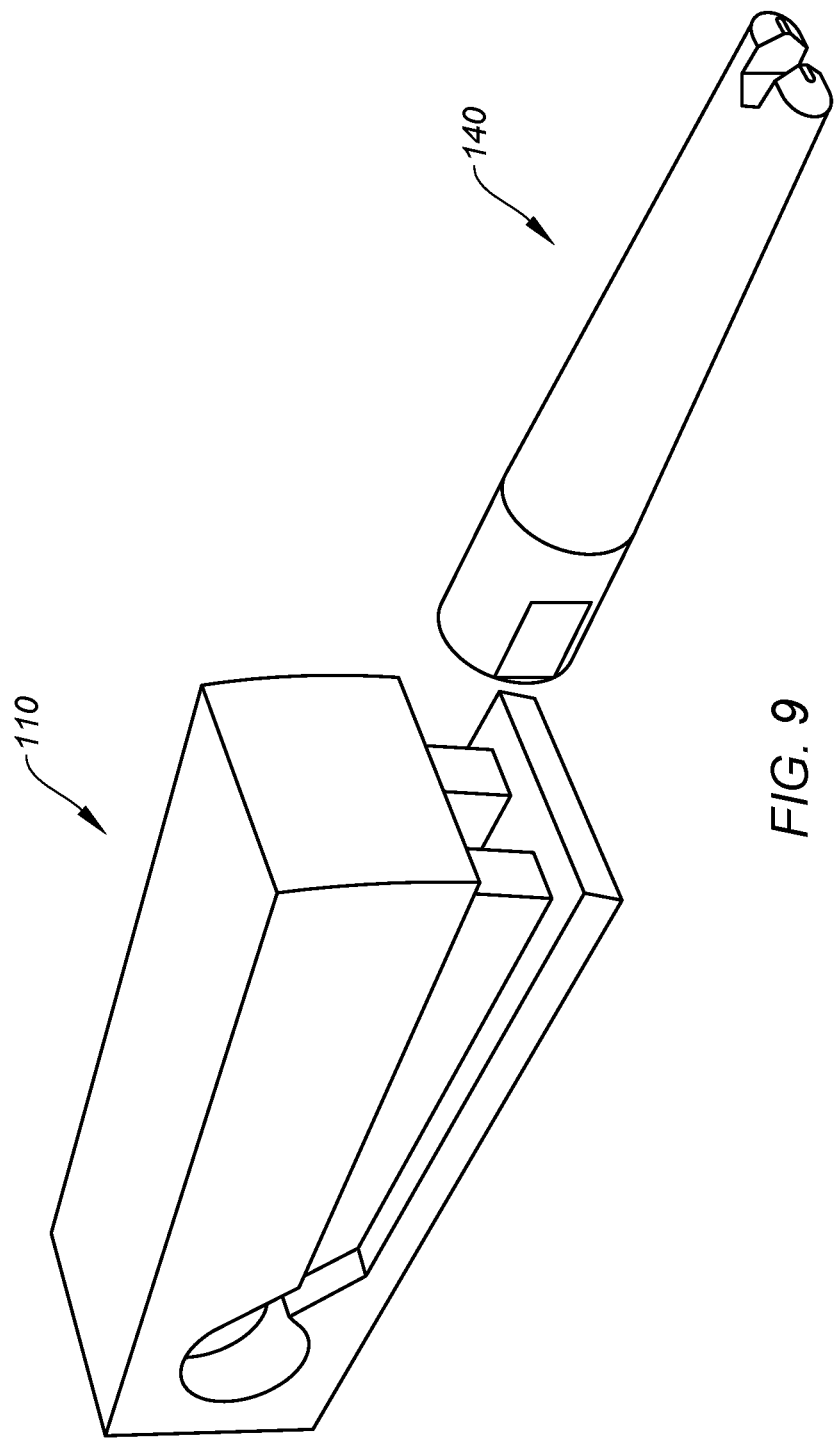
FIG. 9 illustrates an exploded view of the expandable intervertebral cage and inner actuator pin of FIG. 7.

FIG. 9 illustrates the expandable intervertebral cage 110 with the inner actuator pin 140. As mentioned, the pin 140 can function to hold shut the upper and lower plates 120, 122 in order to keep that first, insertion end 112 of the cage 110 in a reduced size for ease of insertion. Later, the pin 140 may be actuated to spread apart the plates 120, 122 and lock them into position.

FIGS. 10A and 10B show the intervertebral cage 110 and its associated inner actuator pin 140 in its manufacturing configuration. Similar to cage 10 and pin 40 above, the processing of all the components into the final assembly can be achieved in one step by generative/additive production techniques (e.g., selective laser melting SLM). Accordingly the inner actuator pin 140 may be manufactured so as to reside within the interior of the intervertebral cage 110, which is itself a unitary body 116, yet the inner actuator pin 140 can still be moveable and rotatable with respect to the cage 110. As understood, this is possible with additive production techniques that allow the manufacturing of multi-component systems to be achieved in a way that these components can interact with one another, be articulating, and not require external fixation elements. In this case, the inner actuator pin 140 may be used to hold the plates 120, 122 of the cage 110 together and keep them from spreading apart. The same pin 140 may also be used to spread apart the plates 120, 122 after insertion, as will be described in greater detail below.

As mentioned above, the implantable devices of the present disclosure may be manufactured in such a way that the processing of all components into the final assembled device is achieved in one step by generative/additive production techniques (e.g., selective laser melting (SLM) or other similar techniques as mentioned above). It should be noted how the benefits of generative/additive production techniques may be utilized here to provide a multi-component assembly with interactive components that do not require any additional external fixation elements to maintain these subcomponents intact and interacting with one another. As can be seen, the entire assembly of cage 10, 110 plus lever pin 40, 140 may be produced altogether as one unit having movable internal parts.

As previously mentioned, devices manufactured in this manner would not have connection seams whereas devices traditionally manufactured would have joined seams to connect one component to another. These connection seams can often represent weakened areas of the implantable device, particularly when the bonds of these seams wear or break over time with repeated use or under stress. By manufacturing the disclosed implantable devices using additive manufacturing, one of the advantages with these devices is that connection seams are avoided entirely and therefore the problem is avoided.

In addition, by manufacturing these devices using an additive manufacturing process, all of the components of the device (that is, both the intervertebral cage and the pins for expanding and blocking) remain a complete construct during both the insertion process as well as the expansion process. That is, multiple components are provided together as a collective single unit so that the collective single unit is inserted into the patient, actuated to allow expansion, and then allowed to remain as a collective single unit in situ. In contrast to other cages requiring external expansion screws or wedges for expansion, in the present embodiments the expansion and blocking components do not need to be inserted into the cage, nor removed from the cage, at any stage during the process. This is because these components are manufactured to be captured internal to the cages, and while freely movable within the cage, are already contained within the cage so that no additional insertion or removal is necessary.

FIGS. 11A and 11B illustrate the cage 110 and pin 140 in greater detail. As shown, the cage 110 may comprise upper plate 120 connected to lower plate 122 at their terminal ends by an elastic-plastic hinge 126, which may be defined by an elastic-plastic joint region 128 at a second, trailing end 114 of the cage 110. The cage may 110 further include an opening 132 leading into a channel 130 for receiving the inner actuator pin 140. The upper plate 120 may have in its underside a ramped surface or adjustment surface 134, while the lower plate 122 may have in its interior a ramped surface or adjustment surface 136. Upper plate 120 may further include a cavity or notched region 158 for receiving the actuator pin 140 to hold the plates 120, 122 together. Likewise, the lower plate 122 may further include a cavity or grooved region 168 for receiving the actuator pin 140 to hold the plates 120, 122 together.

Details of the inner actuator pin 140 may be seen from FIGS. 12A and 12B. The inner actuator pin 140 may comprise a shaft 146 on which there is a keyed feature 148 that functions to rotate the actuator pin 140. The actuator pin 140 may also include an external adjustment surface 154 that cooperates with the adjustment surfaces of the upper and lower plates 120, 122. The actuator pin 140 may terminate in a tip 150 having a notch or groove 152. This pin tip 150 may be configured to interfere with the cavity 158 of the upper plate 120 and the cavity 168 of the lower plate 122 to hold the plates 120, 122 together. The notch 152 can enable locking of the plates 120, 122 relative to one another.

Figure 13E:
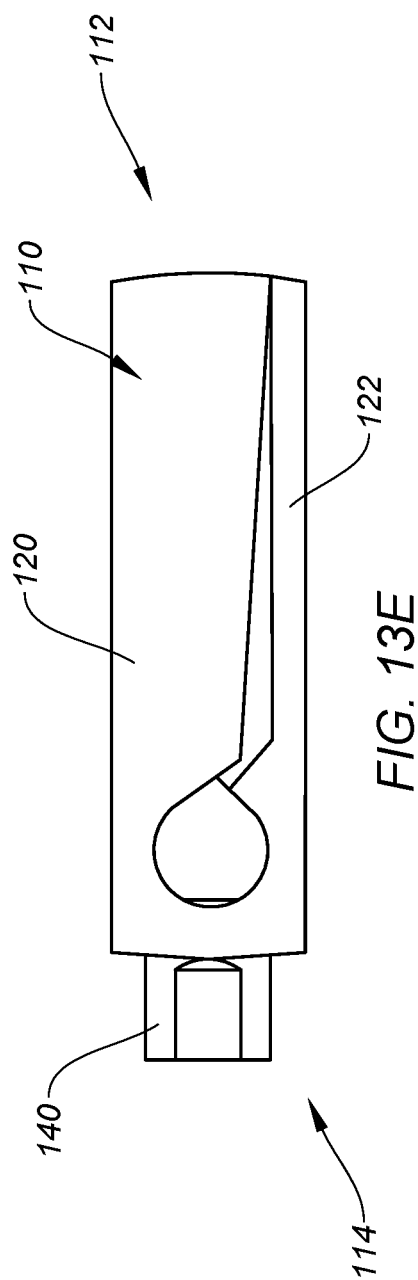
Figure 13F:
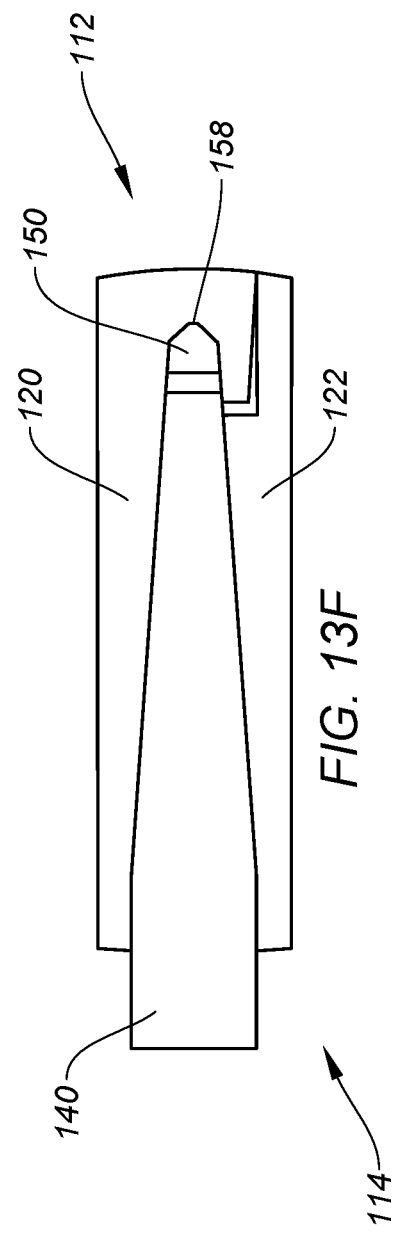

FIGS. 13A-13H illustrate a method of adjusting the expandable intervertebral cage 110. In its pre-insertion stage, the cage 110 may have an open position in which the plates 120, 122 are angled relative to one another, and whereby the inner actuator pin 140 is not engaged with the cavities 158, 168 of the plates 120, 122, as shown in FIGS. 13A and 13B. In FIGS. 13C and 13D, still in a pre-insertion stage, the plates 120, 122 can now be pressed into a closed position such that the plates 120, 122 are parallel to one another and the first, leading end 112 of the cage 110 is in a reduced size to ease insertion through the narrow access path of the intervertebral/intradiscal space. The plates 120, 122 may be fully closed and held together when the pin 140 is moved inside the body 116 such that the pin tip 150 is inserted in the cavities 158, 168 of the plates, as shown in FIGS. 13E and 13F. In this compressed configuration, with the plates 120, 122 held tightly together, the cage 110 may then be inserted into the intervertebral space/intradiscal space.

Figure 13I:
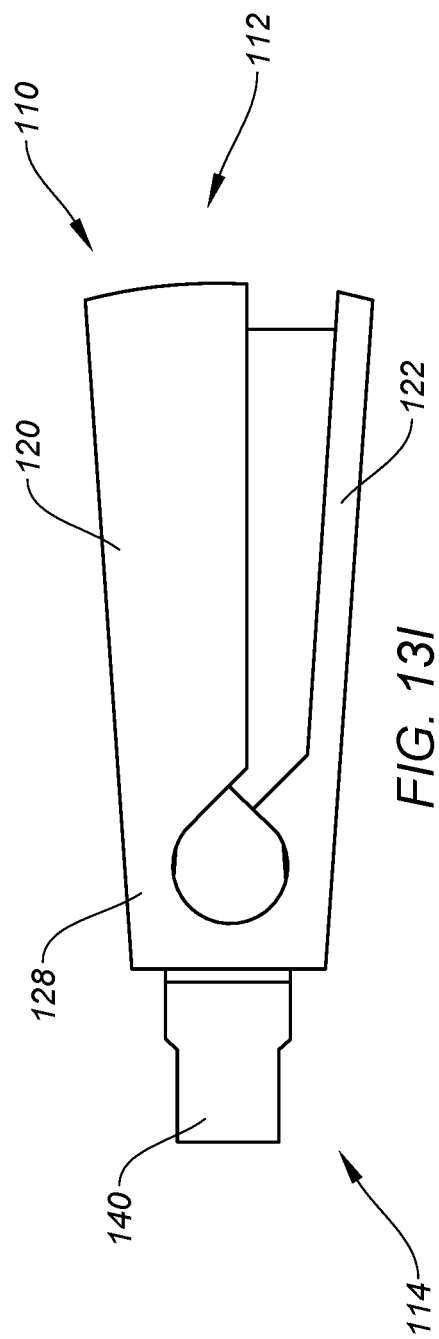
Figure 13J:
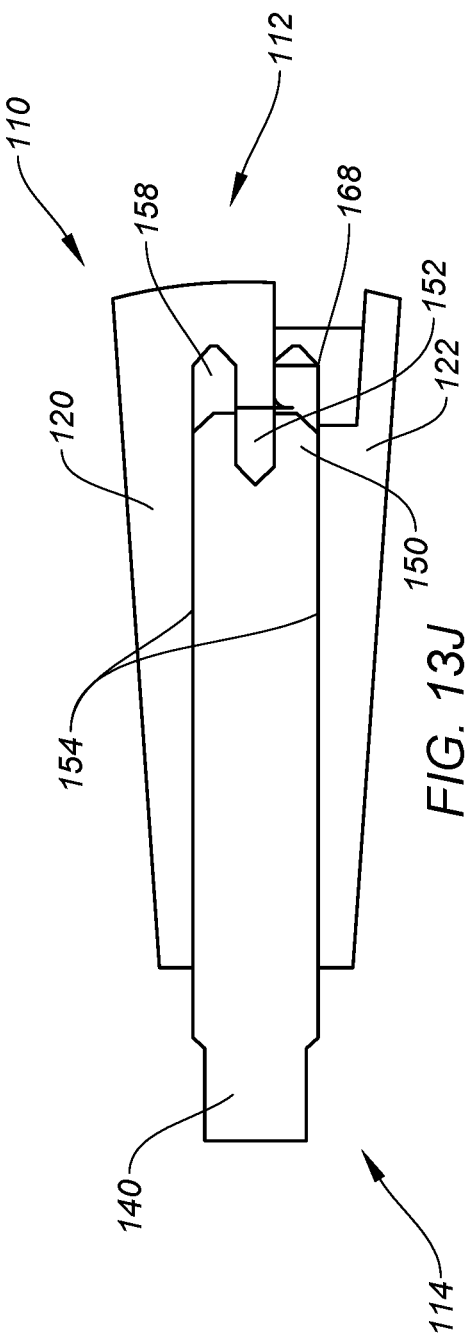

After insertion, the cage 110 may be expanded using the same internal actuator pin 140. As shown in FIGS. 13G and 13H, the plates 120, 122 can be released from its compressed configuration by withdrawing the actuator pin 140 from the cavities 158, 168 of the plates 120, 122. Residual elastic energy retained by the elastic joint areas 128 will urge the plates 120, 122 away from each other in a partial open position. In other words, the release of the actuator pin 140 allows the plates 120, 122 to spring back towards its natural resting position where the plates 120, 122 are space apart at their free ends. Then, as shown in FIGS. 13I and 13J, the actuator pin 140 may be rotated by a full 90 degrees, which will then expand open the plates 120, 122 relative to one another. This 90 degree rotation of the pin 140 causes the adjustment surfaces of the pin 140 and the plates 120, 122 to interfere and counteract one another, exerting force against the plates 120, 122, and spreading them apart as shown. Once the plates 120, 122 have been fully expanded, the actuator pin 140 may be fully inserted by moving the tip 150 forward so that the plates 120, 122 remain locked in position. As shown in FIGS. 13K and 13L, the notch 152 of the actuator pin 140 may be inserted into the cavities 158, 168 of the plates to keep these plates 120, 122 firmly locked in their expanded position. Thus, the actuation of the internal actuator pin 140 that is manufactured inside the intervertebral cage 110 can be made to interfere with the adjustment surfaces of the upper and lower plates 120, 122, causing partial plastic deformation of the elastic joint areas 128 of the hinge 126, and causing the cage 110 to be in a second, expanded configuration.

As with the previous cage, the intervertebral cage 110 of the present disclosure is configured to be able to allow insertion through a narrow access path, but is able to be expanded and angularly adjusted so that the cage is capable of adjusting the angle of lordosis of the vertebral segments. By being able to partially plastically deform at the hinge 126, the cage can accommodate and adapt to larger angles of lordosis. Additionally, the cage can effectively restore sagittal balance and alignment of the spine, and can promote fusion to immobilize and stabilize the spinal segment.

With respect to the ability of the expandable cages 10, 110 to promote fusion, many in-vitro and in-vivo studies on bone healing and fusion have shown that porosity is necessary to allow vascularization, and that the desired infrastructure for promoting new bone growth should have a porous interconnected pore network with surface properties that are optimized for cell attachment, migration, proliferation and differentiation. At the same time, there are many who believe the implant's ability to provide adequate structural support or mechanical integrity for new cellular activity is the main factor to achieving clinical success, while others emphasize the role of porosity as the key feature. Regardless of the relative importance of one aspect in comparison to the other, what is clear is that both structural integrity to stabilize, as well as the porous structure to support cellular growth, are key components of proper and sustainable bone regrowth.

Accordingly, these cages 10, 110 may take advantage of current additive manufacturing techniques that allow for greater customization of the devices by creating a unitary body that may have both solid and porous features in one. In some embodiments, the cages 10, 110 can have a porous structure, and be made with an engineered cellular structure that includes a network of pores, microstructures and nanostructures to facilitate osteosynthesis. For example, the engineered cellular structure can comprise an interconnected network of pores and other micro and nano sized structures that take on a mesh-like appearance. These engineered cellular structures can be provided by etching or blasting to change the surface of the device on the nano level. One type of etching process may utilize, for example, HF acid treatment.

These same manufacturing techniques may be employed to provide these cages with an internal imaging marker. For example, these cages can also include internal imaging markers that allow the user to properly align the cage and generally facilitate insertion through visualization during navigation. A cage may comprise a single marker, or a plurality of markers. These internal imaging markers greatly facilitate the ease and precision of implanting the cages, since it is possible to manufacture the cages with one or more internally embedded markers for improved visualization during navigation and implantation.

Another benefit provided by the implantable devices of the present disclosure is that they are able to be specifically customized to the patient's needs. Customization of the implantable devices is relevant to providing a preferred modulus matching between the implant device and the various qualities and types of bone being treated, such as for example, cortical versus cancellous, apophyseal versus central, and sclerotic versus osteopenic bone, each of which has its own different compression to structural failure data. Likewise, similar data can also be generated for various implant designs, such as for example, porous versus solid, trabecular versus non-trabecular, etc. Such data may be cadaveric, or computer finite element generated. Clinical correlation with, for example, DEXA data can also allow implantable devices to be designed specifically for use with sclerotic, normal, or osteopenic bone. Thus, the ability to provide customized implantable devices such as the ones provided herein allow the matching of the Elastic Modulus of Complex Structures (EMOCS), which enable implantable devices to be engineered to minimize mismatch, mitigate subsidence and optimize healing, thereby providing better clinical outcomes.

A variety of spinal implants may be provided by the present disclosure, including interbody fusion cages for use in either the cervical or lumbar region of the spine. Although only a posterior lumbar interbody fusion (PLIF) device is shown, it is contemplated that the same principles may be utilized in a cervical interbody fusion (CIF) device, a transforaminal lumbar interbody fusion (TLIF) device, anterior lumbar interbody fusion (ALIF) cages, lateral lumbar interbody fusion (LLIF) cages, and oblique lumbar interbody fusion (OLIF) cages.

Other embodiments of the disclosure will be apparent to those skilled in the art from consideration of the specification and practice of the disclosure provided herein. It is intended that the specification and examples be considered as exemplary only.

What is claimed is:

1. An expandable spinal implant comprising:
   a body having an upper plate and a lower plate connected together by an elastically deformable hinge, each of the plates including an inner ramped surface, the implant further having a channel, wherein the body defines a leading end and a trailing end with respect to insertion into an intervertebral space; and
   a lever pin disposed in the channel, the lever pin comprising a shaft having at one end a keyed surface, the lever pin further having at an opposed end an enlarged, shaped head, the shaped head further including an exterior adjustment surface configured to cooperate with the inner ramped surfaces of the plates upon rotation to urge the upper and lower plates apart,
   wherein the lever pin has a length that spans a majority of a distance from the leading end to the trailing end, and the exterior adjustment surface spans a majority of the length of the lever pin.

2. The expandable spinal implant of claim 1, wherein the body and the lever pin are manufactured by an additive production technique, whereby the lever pin is manufactured to reside inside the cage, and the body is devoid of connection seams.

3. The expandable spinal implant of claim 1, wherein the lever pin is manufactured to reside inside the body of the expandable spinal implant.

4. The expandable spinal implant of claim 3, wherein the lever pin is rotatable inside the body of the expandable spinal implant.

5. The expandable spinal implant of claim 1, wherein the enlarged, shaped head of the lever pin has an oblong cross-section.

6. The expandable spinal implant of claim 1, wherein the upper and lower plates are tapered at the leading end.

7. The expandable spinal implant of claim 1, further being configured as a posterior lumbar interbody fusion cage.

8. The expandable spinal implant of claim 1, having a first configuration wherein the plates are parallel to one another.

9. The expandable spinal implant of claim 8, having a second configuration wherein the plates are locked together and are angled relative to one another.

10. The expandable spinal implant of claim 9, wherein in the second configuration, the implant is configured to adjust an angle of lordosis.

11. The expandable spinal implant of claim 9, configured to restore sagittal balance and alignment of a spine when the implant is in the second configuration.

12. The expandable spinal implant of claim 1, wherein the exterior adjustment surface of the shaped head is configured to press against the inner ramped surface of each of the upper and lower plates so as to expand the leading end upon rotation of the lever pin.

13. The expandable spinal implant of claim 12, wherein the inner ramped surface of the upper plate and the inner ramped surface of the lower plate taper toward each other as they extend in a direction from the trailing end toward the leading end, and the exterior adjustment surface of the shaped head is tapered as it extends in a direction from the trailing end toward the leading end.

14. The expandable spinal implant of claim 13, wherein an entirety of the exterior adjustment surface of the shaped head is tapered as it extends in a direction from the trailing end toward the leading end.

15. The expandable spinal implant of claim 1, wherein the keyed surface is configured to lock the lever pin.

16. The expandable spinal implant of claim 1, wherein the one end and the opposed end are on opposite sides of a midpoint that is equidistantly spaced from the leading end and the trailing end.

17. The expandable spinal implant of claim 1, wherein the hinge comprises cutouts in the body at the trailing end.

18. The expandable spinal implant of claim 1, wherein the exterior adjustment surface is oval shaped.

\* \* \* \* \*